(12) United States Patent
Annasagaram Krishnamurthy et al.

(10) Patent No.: US 10,491,734 B1
(45) Date of Patent: Nov. 26, 2019

(54) USER-FRIENDLY VEHICLE BLUETOOTH PAIRING SCHEME

(71) Applicant: Faraday&Future Inc., Gardena, CA (US)

(72) Inventors: Vamsi Krishna Annasagaram Krishnamurthy, San Diego, CA (US); Peter A. Barany, Rancho Palos Verdes, CA (US); Hong Rao, Rancho Palos Verdes, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 16/240,626

(22) Filed: Jan. 4, 2019

(51) Int. Cl.
| | |
|---|---|
| *H04M 1/60* | (2006.01) |
| *H04L 29/08* | (2006.01) |
| *G06F 21/32* | (2013.01) |
| *H04W 4/80* | (2018.01) |

(52) U.S. Cl.
CPC .......... *H04M 1/6091* (2013.01); *G06F 21/32* (2013.01); *H04L 67/16* (2013.01); *H04W 4/80* (2018.02)

(58) Field of Classification Search
CPC ....... H04M 1/6091; H04W 4/80; H04L 67/16; G06F 21/32

USPC ....................................................... 455/569.2
See application file for complete search history.

(56) References Cited

U.S. PATENT DOCUMENTS

| | | | |
|---|---|---|---|
| 8,004,493 B2* | 8/2011 | Herz .................... | G06F 1/1616 345/158 |
| 2006/0288227 A1* | 12/2006 | Kalofonos .......... | H04L 12/2803 713/182 |
| 2007/0208433 A1* | 9/2007 | Coffy .................... | H04W 4/021 700/1 |
| 2017/0048680 A1* | 2/2017 | Chuang ................ | H04W 76/10 |
| 2017/0091732 A1* | 3/2017 | Rezayee ............ | G06Q 20/3278 |
| 2017/0091762 A1* | 3/2017 | Rezayee ............ | G06Q 20/3829 |
| 2017/0324559 A1* | 11/2017 | Hu ........................ | H04L 9/3226 |

* cited by examiner

*Primary Examiner* — Lewis G West
(74) *Attorney, Agent, or Firm* — Knobbe Martens Olson & Bear LLP

(57) ABSTRACT

Generally described, one or more aspects of the present application correspond to techniques for reduced user involvement in Bluetooth pairing between computing devices. For example, a vehicle computing device and a mobile electronic device may execute applications registered with a user account. At least in response to a user command and the vehicle computing device and the mobile electronic device being in proximity with each other, the described techniques can exchange information between the vehicle computing device and mobile electronic device via one or more intermediary servers connected to a network to establish a Bluetooth connection.

20 Claims, 4 Drawing Sheets

USER-FRIENDLY VEHICLE BLUETOOTH PAIRING SCHEME

TECHNICAL FIELD

The systems and methods disclosed herein are directed to systems and methods of Bluetooth pairing, and, more particularly, to vehicle Bluetooth pairing requiring reduced user involvement.

BACKGROUND

Vehicle connectivity platforms have arisen with the emergence of connected infotainment systems (e.g., connected navigation, social media, music streaming, and in-car WiFi) and the accompanying vehicle applications. A connected vehicle can use any of a number of different communication technologies to communicate with computing devices within the vehicle, other vehicles on the road, roadside infrastructure, and remote computing resources. For example, data can be transmitted from or received by a connected vehicle over networks including Bluetooth, satellite connections, WiFi, and 4G/5G.

SUMMARY

The communication pairing techniques disclosed herein have several features, no single one of which is solely responsible for its desirable attributes. Without limiting the scope as expressed by the claims that follow, certain features of a Bluetooth pairing scheme will now be discussed briefly. One skilled in the art will understand how the features of the disclosed Bluetooth pairing scheme provide several advantages over traditional systems and methods.

One aspect relates to a system for performing Bluetooth pairing, the system comprising: a vehicle computing device configured to access a publicly accessible network, the vehicle computing device including: (i) a first display, (ii) a first device that establishes a Bluetooth connection, and (iii) first instructions for implementing a vehicle application registered with a user account; a portable computing device configured to access the publicly accessible network, the portable computing device including: (i) a second display, (ii) a second device that establishes the Bluetooth connection, and (iii) second instructions for implementing a mobile application registered with the user account; and one or more servers accessible to the vehicle computing device and portable computing device via the publicly accessible network, the one or more servers having stored thereon third instructions for acting as an intermediary for Bluetooth pairing for devices commonly registered with the user account. The first instructions can configure the first display of the vehicle computing device to present a pairing initiation user interface providing a first user-selectable option to pair the vehicle computing device to another device. In response to selection of the first user-selectable option, the first, second, and third instructions cause exchange of identifying information between the vehicle computing device and portable computing device via the one or more servers. In response to exchange of the identifying information, the second instructions can configure the second display of the portable computing device to display a passkey user interface that enables a user to complete a passkey requirement. In response to the user completing the passkey requirement, the vehicle computing device pairs to the portable computing device via the first and second devices that establish the Bluetooth connection.

In some embodiments, the first, second, and third instructions can configure the vehicle computing device and portable computing device to exchange the identifying information via communications that are not presented to the user.

In some embodiments, the first instructions can configure the vehicle computing device to perform a detection of an occupant in the vehicle.

In some embodiments, the passkey requirement can comprise numerical comparison.

Another aspect relates to a method for establishing a Bluetooth connection, the method comprising: via a first display of a vehicle computing device that is executing a first application registered with a particular user account, displaying a pairing initiation user interface providing a first user-selectable option to pair the vehicle computing device to another device; identifying a portable computing device in proximity with the vehicle computing device, wherein the portable computing device is executing a second application registered with the particular user account; in response to selection of the first user-selectable option, exchanging identifying information between the vehicle computing device and portable computing device via one or more intermediary servers, wherein the vehicle computing device and portable computing device communicate with the one or more intermediary servers over a network. In response to exchanging the identifying information, displaying, via a second display of the portable computing device, a passkey user interface that enables a user to complete a passkey requirement. In response to the user completing the passkey requirement, establishing the Bluetooth connection between the vehicle computing device and the portable computing device.

In some embodiments, the method further comprises detecting an occupant in the vehicle prior to displaying the pairing initiation user interface.

In some embodiments, the method further comprises, via the vehicle computing device and at least one camera performing facial recognition to authenticate the occupant as authorized to access the particular user account, and logging the first application into the particular user account responsive to authenticating the occupant.

In some embodiments, the method further comprises determining that the vehicle computing device and the portable computing device are in proximity, and displaying an identifier of the portable computing device in the pairing initiation user interface.

In some embodiments, the method further comprises enabling a discoverable mode on the vehicle computing device in response to the selection of the first user-selectable option.

In some embodiments, the method further comprises, via the vehicle computing device, sending a Bluetooth address of the vehicle computing device to the one or more intermediary servers over the network in response to the selection of the first user-selectable option.

In some embodiments, the method further comprises, via the one or more intermediary servers, determining that the first and second applications are both logged in to the particular user account. In response to said determining, sending the Bluetooth address of the vehicle computing device to the portable computing device over the network.

In some embodiments, the network is different from the Bluetooth connection, the method further comprising exchanging information between the vehicle computing device and the portable computing device over the network and via the one or more intermediary servers prior to establishing the Bluetooth connection, and exchanging information between the vehicle computing device and the portable computing device over the Bluetooth connection after establishing the Bluetooth connection.

In some embodiments, the method further comprises exchanging the identifying information via communications that are not revealed to the user.

Another aspect relates to a non-transitory computer-readable media storing instructions, that, when executed, cause a distributed computing system to perform operations for establishing a direct device-to-device wireless connection. The operations comprise: displaying a first user interface providing a first user-selectable option to pair a first computing device to another device, wherein the first computing device is running a first application registered with a particular user account; identifying a second computing device in proximity with the first computing device, wherein the portable computing device is executing a second application registered with the particular user account; in response to selection of the first user-selectable option, the operations further comprise exchanging identifying information between the first computing device and the second computing device via one or more intermediary computing devices, wherein the first and second computing devices access the one or more intermediary computing devices over a network; in response to exchanging the identifying information, displaying a second user interface for completing a passkey requirement; and in response to completion of the passkey requirement, establishing the direct device-to-device wireless connection between the first computing device and the second computing device.

In some embodiments, a vehicle comprises the first computing device, the operations further comprising detecting an occupant in the vehicle prior to displaying the first user interface.

In some embodiments, the operations further comprise performing facial recognition to authenticate the occupant as authorized to access the particular user account, and logging the first application into the particular user account responsive to authenticating the occupant.

In some embodiments, the operations further comprise determining that the first and second computing devices are in proximity, and displaying an identifier of the second computing device in the first user interface.

In some embodiments, the operations further comprise sending a network address of the first device to the one or more intermediary computing devices over the network in response to the selection of the first user-selectable option.

In some embodiments, the operations further comprise, via the one or more intermediary computing devices determining that the first and second applications are both logged in to the particular user account, and in response to said determining, sending the network address of the first computing device to the second computing device over the network.

In some embodiments, the network is different from the direct device-to-device wireless connection. The operations further comprise exchanging information between the first and second computing devices over the network and via the one or more intermediary computing devices prior to establishing the direct device-to-device wireless connection, and exchanging information between the first and second computing devices over the direct device-to-device wireless connection after establishing the direct device-to-device wireless connection.

DETAILED DESCRIPTION

Figure 1:
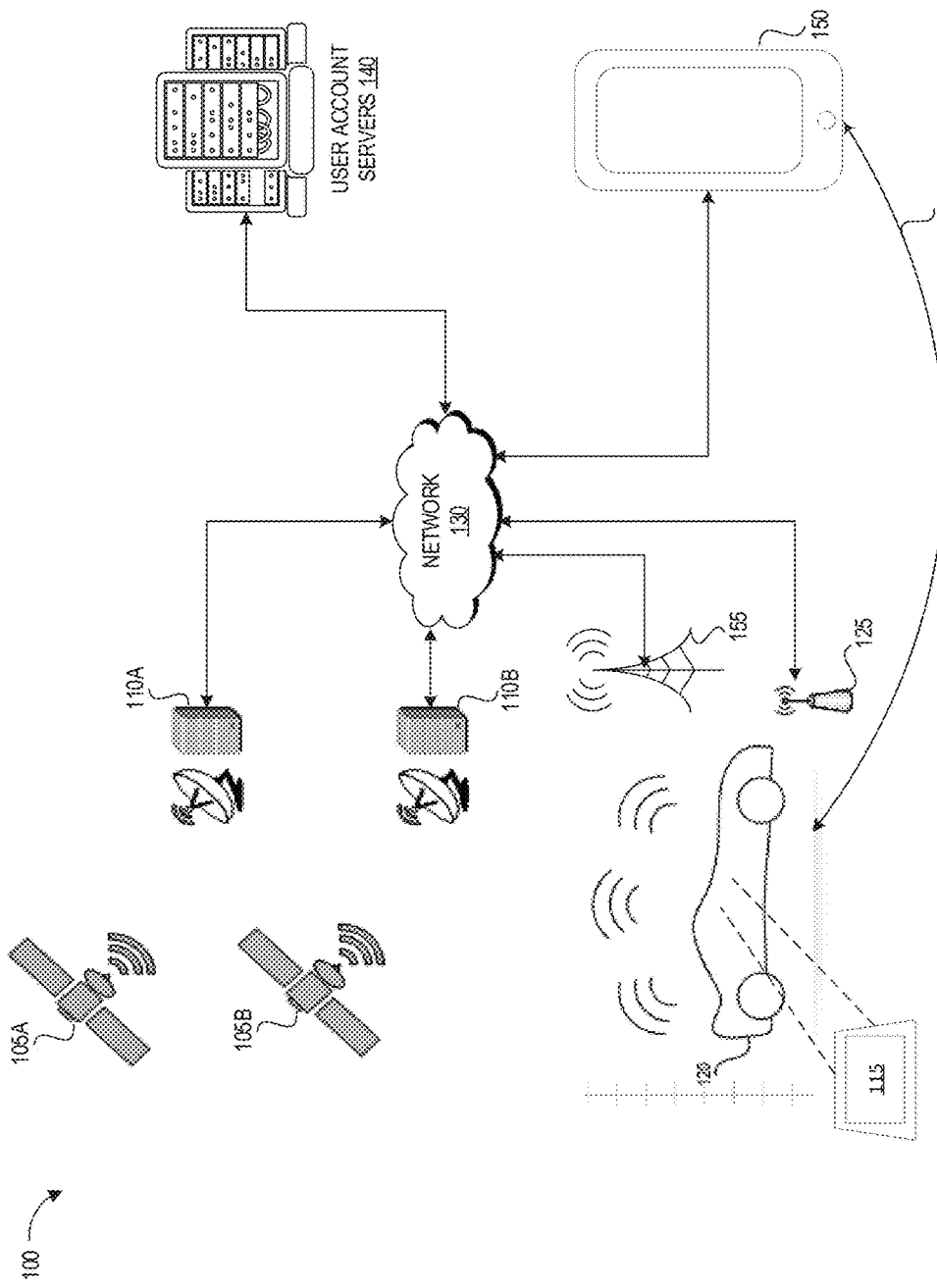
FIG. 1 depicts a schematic diagram of a network connected vehicle communication environment in which various embodiments according to the present disclosure can be implemented.

Generally described, the present disclosure relates to techniques for a simplified user process for establishing Bluetooth pairing between computing devices. Bluetooth is a wireless technology standard for exchanging data between devices over short distances (e.g., using short-wavelength UHF radio waves in the ISM band from 2.4 to 2.485 GHz[3]). Some Bluetooth connections may be established automatically, for example between two devices that are within range of one another. However, many services offered over Bluetooth can expose private data or let a connecting party control the Bluetooth device, creating security concerns around recognizing specific devices and thus exerting control over which devices can connect to a given Bluetooth device. This may be particularly true, for example, in the context of pairing a mobile device to a connected vehicle.

To address such security concerns, Bluetooth can use a process called pairing to establish a bond between two devices. The pairing process is generally performed manually by a user, with user interactions initiating the pairing process and confirming the identity of the devices. Once Bluetooth pairing has occurred, the two devices may communicate with each other. However, pairing computing devices to communicate data via Bluetooth has often been a burdensome and complex task, requiring a user to perform several steps on each device in order to pair the devices. The actions required of the user to complete Bluetooth pairing are often unintuitive and require knowledge of how to navigate the settings menus on multiple different devices. Thus, the goal of addressing Bluetooth security concerns can create additional burdens on users with respect to initiating and completing the pairing process.

The task of navigating a large number of menus on a computing device to access various applications can be burdensome and time consuming for users. This is especially true if the users do not know the locations of the desired items or are unfamiliar with the user interface. For example, a user may wish to pair two devices via a Bluetooth connection, however, this can require navigating through several levels of user interface pages on each device to locate Bluetooth options and settings. Thus, the user has to perform numerous navigational steps before Bluetooth pairing can be initiated and completed.

The Bluetooth pairing processes disclosed herein significantly reduces these problems by removing the need for the user to navigate numerous user interfaces, and by enabling users to perform the desired task (e.g., Bluetooth pairing) with fewer active steps, thereby increasing user-friendliness of the pairing process. For example, a vehicle computing device and a mobile electronic device may each execute respective applications that are registered with the same user account. In addition to Bluetooth connectivity, the vehicle computing device and the mobile device can also communicate via other wireless networks, such as WiFi, satellite, or cellular networks, that provide access to the Internet (or another suitable network). This network access can enable the vehicle computing device and the mobile device to exchange their identifying information automatically via one or more intermediary servers, with the servers facilitating the information exchange due to both devices running applications registered with the same user account. As described below, the user account applications and networked server access serve as programmatic navigational shortcut to take the user to the program of interest (e.g., a complete pairing prompt). For example, the applications and alternate network communications allow the devices to exchange identifying information securely in the background during the pairing process, thereby allowing the user to simply initiate pairing, bypass several typical steps based on the devices communicating over the intermediary server, and then select to complete the pairing process. Beneficially, such shortcuts and reduction in user involvement can improve the speed of Bluetooth pairing and reduce the number of steps taken by the user in navigating settings-related menus. This can be particularly true for computing devices integrated into vehicles, where driver attention to the outside environment is paramount. As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are to illustrate only, and are not intended to be limiting. For example, although described in the context of a connected vehicle, the disclosed simplified Bluetooth pairing techniques can be implemented between any Bluetooth enabled devices. In addition, though examples are presented herein in the context of the Bluetooth standard, the disclosed techniques can be applicable to reduce user actions for pairing according to other technologies, such as Bluetooth Low Energy (BLE), infrared wireless, ultra wideband, induction wireless, or other personal area network (PAN) technologies. As such, the described Bluetooth transceivers may be exchanged for transceivers specific to another PAN technology.

Overview of Example Network Connected Vehicle and Environment

FIG. 1 depicts a schematic diagram of a network connected vehicle communication environment 100 in which various embodiments according to the present disclosure can be implemented. FIG. 1 depicts a connected vehicle 120, which may be a car (as illustrated), truck, van, aerial vehicle, boat, train, or other motorized vehicle. The vehicle 120 may be an electric vehicle in some implementations, or may be a hybrid vehicle, hydrogen vehicle, or combustion vehicle.

The vehicle 120 can be configured to establish a number of different types of wireless network connections, including satellite connections, cellular data connections, and WiFi connections. For example, the vehicle 120 can be equipped to connect to geosynchronous satellites 105A, low-earth orbit satellites 105B, cellular base station transceivers 155 (e.g., for 3G, 4G, LTE, and/or 5G cellular network access), and WiFi access points 125, as they are available. In turn, the geosynchronous satellites 105A and low-earth orbit satellites 105B can communicate with gateways 110A, 110B that provide access to the network 130. These various satellite, cellular, and WiFi network connections can be managed by different third-party entities, referred to herein as "carriers."

The vehicle 120 can use these various connections to communicate over network 130 with remote computing resources such as electronic mobile devices (e.g., smartphones), and user account servers 140. The network 130 can include any appropriate network, including an intranet, the Internet, a cellular network, a local area network or any other such network or combination thereof. In the illustrated embodiment, the network 130 is the Internet. Protocols and components for communicating via the Internet or any of the other aforementioned types of communication networks are known to those skilled in the art of computer communications and thus, need not be described in more detail herein.

The vehicle 120 can include a vehicle computing device 115, such as a vehicle head unit or an on-board computing system that can be physically integrated into the vehicle. The vehicle computing device 115 can be configured to perform the above described protocols and provide components for communicating. The vehicle computing device 115 can include a display. The display can provide user-selectable options including a touch-sensitive display with graphical buttons, voice command features, and/or physical buttons that navigate/select options. The vehicle computing device 115 can further include a communication device capable of receiving and transmitting radio waves, such as a Bluetooth radio chip, that establishes a Bluetooth connection.

The user account servers 140 can store data representing user accounts, as well as devices registered with such user accounts. For example, an owner of the vehicle 120 (and optionally other users of the vehicle) may create a user account and register the vehicle 120 with their account, which may allow the user to customize which/how applications run on the vehicle, configure vehicle settings (e.g., seat positions, heating and air conditioning settings, and other cabin comfort preferences; charging times (of an electric vehicle); software update timing management; network connections), and customize the content delivered to the vehicle (e.g., infotainment content), among other things. Such settings and user preferences may be maintained securely by the user account servers 140. In some implementations, the user account servers 140 can be maintained and securely stored by a manufacturer of the vehicle, or an entity acting as a manager of vehicle user accounts. As described herein, the vehicle 120 can implement a vehicle application that can be registered with a particular user account. The vehicle application can be a software application that is installed on the vehicle 120. For instance, the vehicle 120 can be associated and registered with an account maintained by the user account servers 140, and the vehicle application can manage communications with the user account servers 140 relating to the user account. In some implementations, the vehicle 120 may authenticate a driver or other user prior to logging in to a particular user account on the application. For example, the vehicle 120 can include weight sensors in a seat, computer vision technology, or other suitable passenger detection technology such as Bluetooth low energy advertisement mechanisms, to determine that a driver (or other occupant) is present in the vehicle. After determining that the user is present, the vehicle 120 can use one or more cameras and facial recognition software running on the vehicle computing device 115 to authenticate the user as authorized for the particular user account. Other implementations can use other user authentication techniques, including biometric scanning (e.g., iris or fingerprint), voice authentication, or password entry. The user account servers 140 can store the identities and associated authentication information for users permitted access to a particular account.

In some embodiments, a portable computing device 150 can include a smartphone, tablet, laptop, smartwatch, handheld gaming system, or any other suitable computing device, and can be configured to access the network 130. The portable computing device 150 can include a display (e.g., touchscreen display), and can further include an electronic device capable of establishing Bluetooth connection, such as a Bluetooth radio chip. Similar to the vehicle 120, the portable computing device 150 can also include computer-executable instructions for implementing a mobile application registered with the user account. For example, this may allow the user to control certain vehicle settings from their portable computing device 150, such as turning cabin heating and air conditioning on and off, locking and unlocking the vehicle, starting and stopping charging (of an electric vehicle), setting timings for software updates, and the like. Such controls may be sent to the vehicle 120 via the user account servers 140 after authenticating that the mobile application and vehicle application are registered with the same user account. The device 150 may authenticate the user to log them into the account using similar techniques to those described above.

FIG. 1 further illustrates a Bluetooth connection 135 that can be established between the vehicle 120 and the portable computing device 150 when in proximity and authenticated to one another via the pairing process. This Bluetooth connection 135 can be a direct vehicle 120 to device 150 data transfer connection via Bluetooth radio transceivers in the vehicle 120 and device 150. Herein, being "in proximity" refers to devices that are within a Bluetooth connection range from one another. Depending on the class of Bluetooth device, being in proximity may include a range of less than ~100 meters, with ~10 meters or less being the most common in mobile devices to establish a Bluetooth connection.

As described in greater detail below, the vehicle computing device 115 can includes instructions to display a pairing initiation user interface providing a user-selectable option to pair the vehicle computing device 115 to the portable computing device 150. In response to the user selecting to pair the devices, by, for example, pressing a button or location on a touchscreen display associated with pairing instructions, an exchange of identifying information between the vehicle computing device 115 and portable computing device 150 can occur via the network 130 and vehicle servers 140. When a user initiates a Bluetooth pairing from their vehicle 120, for example, the vehicle 120 can execute the application that is registered with the particular user account to send (via the network 130) identifying information about the vehicle 120 and any in-range Bluetooth devices to the user account servers 140. The user account servers 140 can use the network 130 to attempt communications with the in-range devices for determining whether any of the in-range devices are also executing an application registered with the same user account. If so, the user account servers 140 can securely exchange identifying information between those devices for purposes of Bluetooth pairing, as described herein. Thereafter, the user may be presented with a second user interface that enables the user to confirm the pairing (e.g., by entering or confirming a passkey, or other suitable measures). In this manner, the actions required from the user to complete the pairing are reduced to first initiating the pairing and second confirming the pairing, without the typical user actions relating to settings menu navigation, as these are handled programmatically via communications through the user account servers 140 and the network 130. Thus, the disclosed technology leverages an additional network connection (e.g., network 130 in addition to the Bluetooth connection 135) and user account servers 140 acting as an intermediary between the vehicle 120 and device 150 in order to reduce the steps required by the user to complete a Bluetooth pairing.

Overview of Example Bluetooth Pairing Schemes

Figure 2:
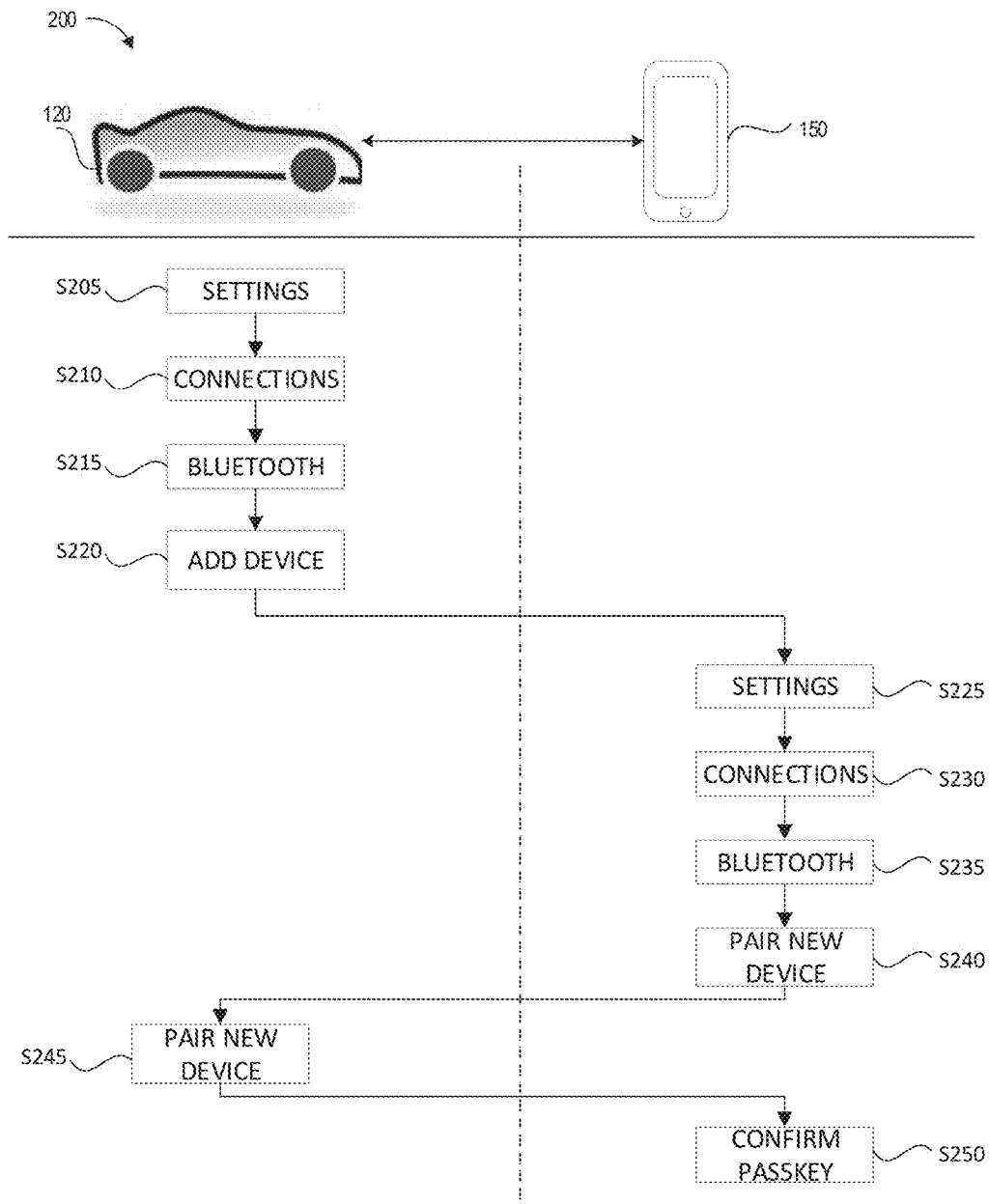
FIG. 2 depicts a flow diagram of example user-implemented steps for performing Bluetooth pairing according to some pairing methods.

FIG. 2 depicts a flow diagram of an example Bluetooth pairing process 200, which can accomplish Bluetooth pairing between a connected vehicle and a mobile device using a similar user-facing workflow to existing methods. As discussed above, the existing methods of Bluetooth pairing often require the user to navigate through several steps and different menus on each device before pairing can be achieved. FIG. 2 depicts example steps that may be required of a user to pair a vehicle 120 with a portable computing device 150 according to such methods.

At S205, the user may be required to navigate to a "Settings" page in the vehicle computing device 115. As used herein, a "page" refers to a particular user interface screen or menu, displayed in a browser or software application, which may occupy the entire display or just a portion thereof. From Settings, at S210, the user may be required to select a "Connections" page where the user is presented with several connection options. At S215, the user selects "Bluetooth" among the list of connection options. The user may then be presented with a variety of options related to Bluetooth, including a list of Bluetooth-enabled devices in proximity of the vehicle 120. If a proximate device is new (e.g., not having been previously paired with the vehicle), the user may select "Add Device" at S220.

At S225, the user may then be required to shift their attention to the portable computing device 150 and there again navigate to a "Settings" page in the portable computing device 150. From Settings, at S230 the user may be required to select a "Connections" option where the user is presented with several connection options. At S235, the user selects "Bluetooth" among the list of connection options. The user may then be presented with a variety of options related to the device's Bluetooth, including a list of Bluetooth enabled devices in proximity of the portable computing device 150. Assuming the vehicle 120 is proximate to the portable computing device 150, the user may select "Pair New Device". At S245, the user may then have to shift their attention back to the vehicle 120 to select "Pair New Device". Finally, at S250 the user may be required to confirm a passkey provided by the vehicle 120 on the portable computing device 150.

FIG. 2 only illustrates the steps that require active participation of the user. As such, the process 200 of FIG. 2 requires the user to navigate through at least ten different pages across two separate devices in order to establish Bluetooth pairing. Additional steps being performed in the background by software programs have not been discussed in FIG. 2.

Figure 3:
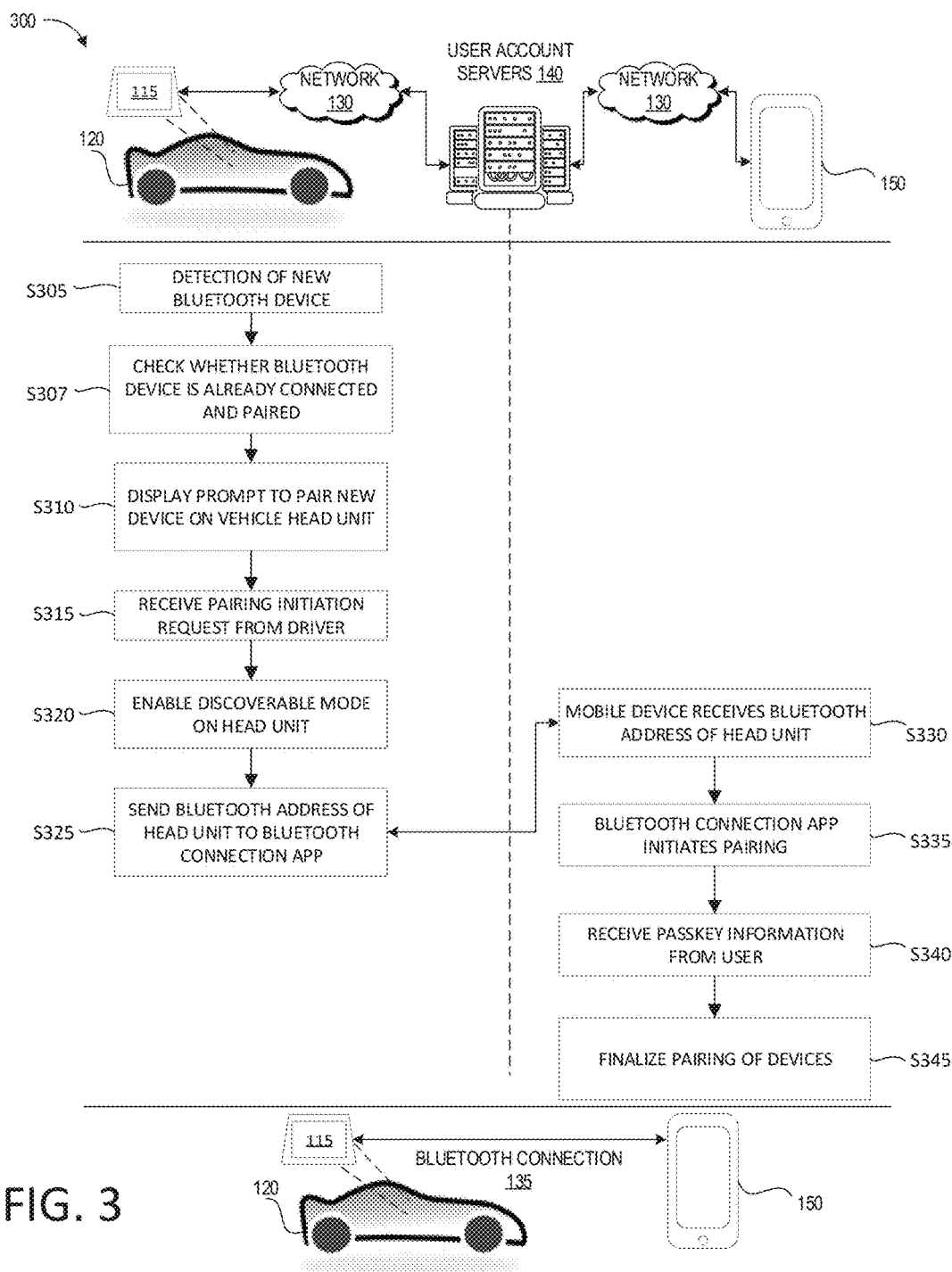
FIG. 3 depicts a flow diagram of example operations for performing Bluetooth pairing of the network connected vehicle of FIG. 1 with a reduced burden on the user, as described herein.

FIG. 3 depicts a flow diagram of an example Bluetooth pairing process 300 according to the present disclosure which reduces user involvement and simplifies the user-facing requirements of the pairing process. It will be noted, that, unlike FIG. 2 which only depicts the actions required of the user, FIG. 3 illustrates both the actions required of the user as well as the programming procedure being executed in the background. As a pre-requisite to the process 300, the user preferably has logged in to the same user account on both the vehicle 120 and the device 150, for example using user authentication techniques as described above. If not, additional preliminary steps can be performed as part of the process 300 to authenticate the user as an individual who is allowed to use the user account.

As depicted, the vehicle computing device 115 and portable computing device 150 are initially connected indirectly with one another via the publicly accessible network 130 and intermediary user account servers 140. As described herein, the user account servers 140 can store instructions for acting as an intermediary for Bluetooth pairing for devices commonly registered with the same user account.

The process 300 can begin at S305 when, for example, the portable computing device 150 is detected by the vehicle computing device 115. Detection of a Bluetooth device can occur in a variety of manners. For example, the vehicle 120 can be equipped with an occupant detection system which detects the presence of a person in the vehicle (e.g., via one or more of facial recognition, seat weight sensors, Bluetooth advertisement packets, etc.). In the case of facial recognition, user credentials from the vehicle computing device 115 can be matched with user credentials from the portable computing device 150 via network 130. As another example, proximity sensors can be used to identify the portable computing device 150 via Bluetooth advertisement packets. These proximity sensors and/or advertisement packets can be tagged to unique user identification information located on user account servers 140. Vehicle computing device 115 can receive this user identification information via network 130, which vehicle computing device 115 can then use to login with the same user credentials as the portable computing device 150. The unique user identification information can be a unique ID which is tied to user login credentials or, in some embodiments, it can be the login credentials themselves. Once an occupant is detected, the vehicle computing device searches for proximate Bluetooth enabled devices. The vehicle computing device 115 can comprise proximity sensors which are capable of automatically detecting the presence of near-by Bluetooth enabled devices, such as the portable computing device 150, when they are in a discoverable mode. The process 300 may include a precondition that the vehicle computing device 115 and the portable computing device 150 are registered with and logged into an account of a Bluetooth application. The account and application may be hosted by the vehicle manager.

Figure 4:
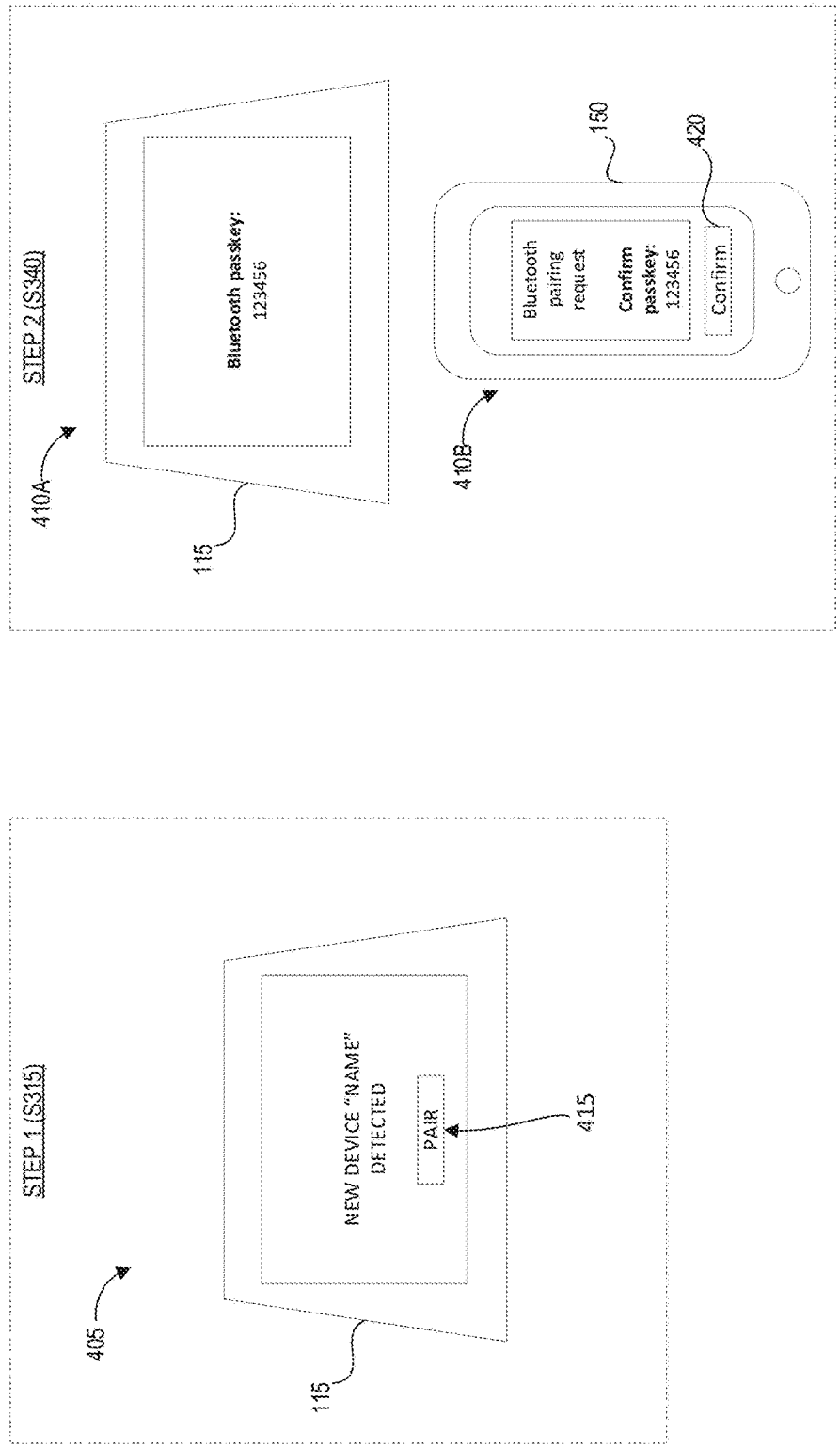
FIG. 4 depicts a schematic diagram of example user-implemented steps for performing Bluetooth pairing according to the operations of FIG. 3.

At S307, the vehicle computing device 115 can check user account servers 140 to see if the portable computing device 150 is already connected and paired. This check can be done by validating whether the user login is connected to Bluetooth on their portable computing device 150 with the portable computing device's 150 Bluetooth mac address. If vehicle computing device 115 determines portable computing device 150 is already connected and paired, the process 300 will end. If vehicle computing device 115 determines portable computing device 150 is not already connected and paired, process 300 proceeds to S310. At S310, in response to the detection of the portable computing device 150, the vehicle computing device 115 can display a prompt to the user to pair the devices, for example as is shown in FIG. 4. In some embodiments, the vehicle computing device 115 displays user login information or a user's name (for example, "Name" in FIG. 4). At S315 the user can choose to pair the devices by selecting the displayed pairing option. If the driver chooses to pair the devices, the vehicle computing device 115 can request pairing information of the portable computing device via the vehicle user account application. If the driver chooses not to pair the devices, the process ends. The prompt to pair the devices can additionally or alternatively be displayed on a screen of the portable computing device 150, in which case the portable computing device 150 can then request the pairing information of the vehicle computing unit via the mobile user account. Step S315 represents the user interaction with the first user interface (e.g., the pairing initiation user interface) displayed to the user during the disclosed pairing process.

At S320, a discoverable mode on the vehicle computing device 115 can be enabled in response to the user selecting to pair the portable computing device 150. At S325 the vehicle computing device 115 can be configured to send its pairing features (e.g., Bluetooth device (mac) address, device friendly name, etc.) over the network 130 to the user account, for example after authentication by the user account servers 140 that both devices are executing applications registered with the same user account. At S330, the portable computing device 150 receives, via the user account servers 140, the Bluetooth address of the vehicle computing device 115 allowing the portable computing device 150 to initiate Bluetooth pairing at block S335. If no Bluetooth address is received within a predetermined period of time, then the user may be notified that the request was unsuccessful and the process may end.

At block S335, one or both of the following can occur: (1) the portable computing device 150 receives, via the user account servers 140, the pairing features of the vehicle computing device 115, and (2) the vehicle computing device 115 receives, via the user account servers 140, the pairing features of the portable computing device 150, allowing the devices to initiate Bluetooth pairing. As described herein, pairing features for a particular device can include, for example, input/output (I/O) capabilities and requirements for secure connections (e.g., any requirements for man-in-the-middle protection, any encryption information). The pairing feature exchange via the user account servers 140 enables both devices to understand each other's pairing features.

As will be appreciated, blocks S320-S335 represent "background" communications, e.g., transfer of information between devices that is not actively managed by the user. In some implementations this information exchange may be invisible to the user, in that no indication of the exchange is displayed. Some embodiments may display a user interface indicating that pairing information is being exchanged, for example updating the display when particular pieces of information has been successfully sent.

After the pairing information exchange, both devices can select which key generation method may be used in subsequent phases (e.g. "Just Works", passkey entry, out-of-band, or numeric comparison). The key, when entered into both devices, can be used to generate link keys. These link keys can be locally maintained by both devices and used in cryptographic algorithms to generate matching sequences, for example so that the devices can exchange information securely over the Bluetooth connection, and as such may be considered as encryption keys. The key selected by the initiator of the process 300 may be passed to the responder device via the user account servers 140. As described herein, "identifying information" can include both the Bluetooth address, pairing features, and link key used to identify the devices to one another and establish the connection 135.

In some embodiments, a passkey or code entry or verification may be implemented in a second user interface. For example, at S340, a numeric comparison method can be used where the portable computing device 150 and the vehicle computing device 115 both display a code. The user then compares each code to ensure that they match, and selects an option confirming that the codes match. This technique, referred to as numeric comparison, thus provides the key to both devices. The passkey verification step may alternatively require a passkey entry method where a code is displayed on only one device and the user is required to enter the code into the other device. These challenge-response schemes can verify that the device requesting access has knowledge of the correct link key. In some embodiments, passkey authentication may not be required, for instance, process 300 may use the Just Works method (e.g., where the key for both devices are set to some predetermined value, such as all zeros). Out of band authentication can be used in some embodiments, for example where an image displayed on the screen of one device is imaged by a camera of the other device to exchange information. Thus, block S340 represents a second user interface (e.g., the passkey user interface) shown to the user during the disclosed pairing process.

After the user has authenticated the passkey information, at S345, Bluetooth pairing of the devices is finalized. This is shown in FIG. 3 with the direct Bluetooth connection 135 established between the vehicle computing device 115 and the portable computing device 150. In some implementations, an initial run of this pairing process 300 can establish a Bluetooth bond between the vehicle computing device 115 and the portable computing device 150. This bond (and the associated link key) can be remembered by both devices such that they may automatically connect to one another within range after completion of the process 300.

As described above, only two steps of the process 300 (e.g., S315 and S340) involve action on the part of the user. Thus, the process 300 can allow a user to pair the vehicle computing unit 115 and the portable computing unit 150 with only two actions taken by the user (e.g., S315 and S340). Therefore, the process 300 is favorable over the process 200 of FIG. 2 because of the reduced steps required of the user.

FIG. 3 illustrates the vehicle computing device 115 initiating the pairing process by, for instance, detecting a new device, displaying a prompt to pair, and receiving a pairing request from the user. However, as described above, it will be understood that such steps may additionally or alternatively be performed on the portable computing device 150.

FIG. 4 depicts example schematic user interfaces highlighting an advantage of the process 300, relating to the two steps that involve user interaction. FIG. 4 illustrates example user interfaces corresponding to each of these steps (depicted as step 1 and step 2) that facilitate the actions performed by the user to complete Bluetooth pairing.

Specifically, FIG. 4 depicts an example of the pairing initiation user 405 interface displayed at step S310 together with the user-selectable feature 415 selected at step S315 when the user chooses to pair the devices. The user can indicate to the vehicle computing device 115 to begin the disclosed pairing process 300 by selecting the displayed user-selectable pairing option feature 415. For example, the display may be touch sensitive such that the user can select the feature 415 with the press of a finger. In some implementations, controls (e.g., buttons and scroll wheels) within the vehicle (e.g., on the steering wheel) may enable the user to select the feature 415. Other implementations can additionally or alternatively enable the user to provide this indication via voice commands, and the user interface 405 can be modified accordingly. Although FIG. 4 depicts the pairing prompt being displayed and selected on the vehicle computing device 115, it will be appreciated that the prompt and selection could also be made on the portable computing device 150.

FIG. 4 also depicts an example pair of passkey user interfaces 410A, 410B that can be presented at S340 to enable the user to perform passkey authentication. The first passkey user interface 410A displayed on the display of the vehicle computing device 115 presents the passkey and does not require user interaction. The second passkey user interface 410B presented on the display of the user device 150 also displays a passkey, and includes a user-selectable feature 420 to confirm that the two passkeys are the same. The example passkey user interfaces 410A, 410B correspond to numerical comparison authentication, however it will be appreciated that this can be modified as needed to accommodate the other authentication techniques as described above with respect to FIG. 3. As will be appreciated, the passkey authentication user interfaces 410A, 410B could be swapped such that interface 410A is displayed on the mobile device 150 while interface 410B is displayed on the vehicle computing device 115, with the interface 410A depicted on the device is the initiator of the process 300 and interface 410B depicted on the device that is the responder in the process 300, or vice versa.

As can be seen, the user requirements during the pairing process are dramatically reduced by the disclosed techniques such that only two-steps are required by the user to complete the Bluetooth pairing. In contrast, the process illustrated in FIG. 2 requires the user to perform ten actions to complete Bluetooth pairing.

Although the disclosed pairing techniques are discussed in the example context of establishing a Bluetooth pairing, it will be appreciated that the use of an intermediary server to exchange information between the devices and simplify the user-facing side of the pairing procedure are not limited to the Bluetooth standard. For example, the disclosed pairing techniques can apply to other radio, near-field, and direct device-to-device pairing technologies.

TERMINOLOGY

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The disclosed processes may begin in response to an event, such as on a predetermined or dynamically determined schedule, on demand when initiated by a user or system administer, or in response to some other event. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for performing Bluetooth pairing, the system comprising:
   a vehicle computing device configured to access a publicly accessible network, the vehicle computing device including: (i) a first display, (ii) a first device that establishes a Bluetooth connection, and (iii) first instructions for implementing a vehicle application registered with a user account;
   a portable computing device configured to access the publicly accessible network, the portable computing device including: (i) a second display, (ii) a second device that establishes the Bluetooth connection, and (iii) second instructions for implementing a mobile application registered with the user account; and
   one or more servers accessible to the vehicle computing device and portable computing device via the publicly accessible network, the one or more servers having stored thereon third instructions for acting as an intermediary for Bluetooth pairing for devices commonly registered with the user account;
wherein:
the first instructions configure the first display of the vehicle computing device to present a pairing initiation user interface providing a first user-selectable option to pair the vehicle computing device to another device;
in response to selection of the first user-selectable option, the first, second, and third instructions cause exchange of identifying information between the vehicle computing device and portable computing device via the one or more servers;
in response to exchange of the identifying information, the second instructions configure the second display of the portable computing device to display a passkey user interface that enables a user to complete a passkey requirement; and
in response to the user completing the passkey requirement, the vehicle computing device pairs to the portable computing device via the first and second devices that establish the Bluetooth connection.

2. The system of claim 1, wherein the first, second, and third instructions configure the vehicle computing device and portable computing device to exchange the identifying information via communications that are not presented to the user.

3. The system of claim 1, wherein the first instructions configure the vehicle computing device to perform a detection of an occupant in the vehicle.

4. The system of claim 1, wherein the passkey requirement comprises numerical comparison.

5. A method for establishing a Bluetooth connection, the method comprising:
via a first display of a vehicle computing device that is executing a first application registered with a particular user account, displaying a pairing initiation user interface providing a first user-selectable option to pair the vehicle computing device to another device;
identifying a portable computing device in proximity with the vehicle computing device, wherein the portable computing device is executing a second application registered with the particular user account;
in response to selection of the first user-selectable option, exchanging identifying information between the vehicle computing device and portable computing device via one or more intermediary servers, wherein the vehicle computing device and portable computing device communicate with the one or more intermediary servers over a network;
in response to exchanging the identifying information, displaying, via a second display of the portable computing device, a passkey user interface that enables a user to complete a passkey requirement; and
in response to the user completing the passkey requirement, establishing the Bluetooth connection between the vehicle computing device and the portable computing device.

6. The method of claim 5, further comprising detecting an occupant in the vehicle prior to displaying the pairing initiation user interface.

7. The method of claim 6, further comprising, via the vehicle computing device and at least one camera:
performing facial recognition to authenticate the occupant as authorized to access the particular user account; and
logging the first application into the particular user account responsive to authenticating the occupant.

8. The method of claim 5, further comprising:
determining that the vehicle computing device and the portable computing device are in proximity; and
displaying an identifier of the portable computing device in the pairing initiation user interface.

9. The method of claim 5, further comprising enabling a discoverable mode on the vehicle computing device in response to the selection of the first user-selectable option.

10. The method of claim 5, further comprising, via the vehicle computing device, sending a Bluetooth address of the vehicle computing device to the one or more intermediary servers over the network in response to the selection of the first user-selectable option.

11. The method of claim 10, further comprising, via the one or more intermediary servers:
determining that the first and second applications are both logged in to the particular user account; and
in response to said determining, sending the Bluetooth address of the vehicle computing device to the portable computing device over the network.

12. The method of claim 5, wherein the network is different from the Bluetooth connection, the method further comprising:
exchanging information between the vehicle computing device and the portable computing device over the network and via the one or more intermediary servers prior to establishing the Bluetooth connection; and
exchanging information between the vehicle computing device and the portable computing device over the Bluetooth connection after establishing the Bluetooth connection.

13. The method of claim 5, further comprising exchanging the identifying information via communications that are not revealed to the user.

14. A non-transitory computer-readable media storing instructions, that, when executed, cause a distributed computing system to perform operations for establishing a direct device-to-device wireless connection, the operations comprising:
displaying a first user interface providing a first user-selectable option to pair a first computing device to another device, wherein the first computing device is running a first application registered with a particular user account;
identifying a second computing device in proximity with the first computing device, wherein the portable computing device is executing a second application registered with the particular user account;
in response to selection of the first user-selectable option, exchanging identifying information between the first computing device and the second computing device via one or more intermediary computing devices, wherein the first and second computing devices access the one or more intermediary computing devices over a network;
in response to exchanging the identifying information, displaying a second user interface for completing a passkey requirement; and
in response to completion of the passkey requirement, establishing the direct device-to-device wireless connection between the first computing device and the second computing device.

15. The non-transitory computer-readable media of claim 14, wherein a vehicle comprises the first computing device, the operations further comprising detecting an occupant in the vehicle prior to displaying the first user interface.

16. The non-transitory computer-readable media of claim 15, the operations further comprising:
    performing facial recognition to authenticate the occupant as authorized to access the particular user account; and
    logging the first application into the particular user account responsive to authenticating the occupant.

17. The non-transitory computer-readable media of claim 14, the operations further comprising:
    determining that the first and second computing devices are in proximity; and
    displaying an identifier of the second computing device in the first user interface.

18. The non-transitory computer-readable media of claim 14, the operations further comprising sending a network address of the first device to the one or more intermediary computing devices over the network in response to the selection of the first user-selectable option.

19. The non-transitory computer-readable media of claim 14, the operations further comprising, via the one or more intermediary computing devices:
    determining that the first and second applications are both logged in to the particular user account; and
    in response to said determining, sending the network address of the first computing device to the second computing device over the network.

20. The non-transitory computer-readable media of claim 14, wherein the network is different from the direct device-to-device wireless connection, the operations further comprising:
    exchanging information between the first and second computing devices over the network and via the one or more intermediary computing devices prior to establishing the direct device-to-device wireless connection; and
    exchanging information between the first and second computing devices over the direct device-to-device wireless connection after establishing the direct device-to-device wireless connection.

* * * * *